(12) United States Patent
Kurokawa (10) Patent No.: US 9,969,440 B2
(45) Date of Patent: May 15, 2018

(54) JOINING STRUCTURE OF VEHICLE FRAMEWORK MEMBERS

(71) Applicant: TOYOTA JIDOSHA KABUSHIKI KAISHA, Toyota-shi (JP)

(72) Inventor: Hiroyuki Kurokawa, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 12 days.

(21) Appl. No.: 15/349,279

(22) Filed: Nov. 11, 2016

(65) Prior Publication Data

US 2017/0137071 A1 May 18, 2017

(30) Foreign Application Priority Data

Nov. 16, 2015 (JP) ................................ 2015-224194

(51) Int. Cl.
| | |
|---|---|
| *B62D 27/02* | (2006.01) |
| *B62D 21/02* | (2006.01) |
| *B62D 21/03* | (2006.01) |
| *B62D 21/11* | (2006.01) |

(52) U.S. Cl.
CPC .......... *B62D 27/023* (2013.01); *B62D 21/02* (2013.01); *B62D 21/03* (2013.01); *B62D 21/11* (2013.01)

(58) Field of Classification Search
CPC ...... B62D 21/02; B62D 21/03; B62D 27/023; B62D 21/11

USPC .................................................... 296/203.01
See application file for complete search history.

(56) References Cited

U.S. PATENT DOCUMENTS 9,216,775 B2 * 12/2015 Ohhama ................ B62D 21/11

FOREIGN PATENT DOCUMENTS

| JP | 2003-136243 | 5/2003 |
| JP | 2004-210023 | 7/2004 |

* cited by examiner

*Primary Examiner* — Pinel E Romain
(74) *Attorney, Agent, or Firm* — Oblon, McClelland, Maier & Neustadt, L.L.P.

(57) ABSTRACT

A joining structure of vehicle framework members includes: a first vehicle framework member formed by a lightweight metal material having a rectangular closed cross section shape in a sectional view orthogonal to an extension direction of the first vehicle framework member; a second vehicle framework member formed by a lightweight metal material having a hat shape in the sectional view orthogonal to the extension direction, the second vehicle framework member covering the first vehicle framework member; an offset flange portion that is a portion of a flange portion formed at an end portion at the opening side of the second vehicle framework member, and that protrudes to an opposite side of the flange portion from the opening side; and a protrusion portion that protrudes from an end portion of the offset flange portion at the opening side, and that is joined to the first vehicle framework member by heat-welding.

5 Claims, 6 Drawing Sheets

JOINING STRUCTURE OF VEHICLE FRAMEWORK MEMBERS

CROSS-REFERENCE TO RELATED APPLICATION

This application is based on and claims priority under 35 USC 119 from Japanese Patent Application No. 2015-224194 filed on Nov. 16, 2015, the disclosure of which is incorporated by reference herein.

BACKGROUND

Technical Field

The present disclosure relates to a joining structure of vehicle framework members.

Related Art

A structure has been known since heretofore in which a reinforcing member fabricated of an aluminium alloy, which is formed by extrusion molding, is joined to and integrated with a frame main body fabricated of an aluminium alloy, which is formed by die-casting, by arc welding, laser welding or the like (for example, see Japanese Patent Application Laid-Open (JP-A) No. 2004-210023).

However, when vehicle framework members fabricated of aluminium alloy are welded (for example, heat-welded) to one another, the hardnesses (strengths) of the vehicle framework members in a vicinity of a welded portion are lowered by heat that is produced during the welding.

SUMMARY

The present disclosure provides a joining structure of vehicle framework members that may reduce a fall in strength in a vicinity of a joining portion of the vehicle framework members even if the vehicle framework members are joined to one another by heat-welding.

One aspect relating to the present disclosure is a joining structure of vehicle framework members, including: a first vehicle framework member formed by a lightweight metal material having a rectangular closed cross section shape in a sectional view orthogonal to an extension direction of the first vehicle framework member; a second vehicle framework member formed by a lightweight metal material having a hat shape in the sectional view orthogonal to the extension direction, the second vehicle framework member covering the first vehicle framework member; an offset flange portion that is a portion of a flange portion formed at an end portion at the side of the second vehicle framework member at which the opening is disposed, the offset flange portion protruding to an opposite side of the flange portion from the side at which the opening is disposed; and a protrusion portion that protrudes from an end portion of the offset flange portion at the side at which the opening is disposed, the protrusion portion being joined to the first vehicle framework member by heat-welding.

According to the present aspect, a portion of the flange portion of the second vehicle framework member is formed as the offset flange portion that protrudes to the opposite side of the flange portion from the side thereof at which the opening is disposed. The protrusion portion that protrudes from the end portion of the offset flange portion at the side thereof at which the opening is disposed is joined to the first vehicle framework member by heat-welding. Therefore, the strength of a vicinity of the protrusion portion that is joined by heat-welding to the first vehicle framework member is reinforced by the offset flange portion. That is, even though the first vehicle framework member and the second vehicle framework member are joined by heat-welding, a fall in strength in the vicinity of a joining portion of the first vehicle framework member and the second vehicle framework member is reduced.

In the aspect described above, the protrusion portion may protrude as far as the end portion of the flange portion at the side thereof at which the opening is disposed.

According to the structure described above, the protrusion portion protrudes as far as the end portion at the side of the flange portion at which the opening is disposed. Therefore, compared to a structure in which the protrusion portion does not protrude as far as the side of the flange portion at which the opening is disposed, an area for the joining portion by heat-welding may be appropriately assured and a joining strength may be reliably assured.

In the present aspect, the offset flange portion may be plurally formed along the extension direction.

According to the structure described above, a plural number of the offset flange portion are formed in the extension direction. Thus, joining strength between the first vehicle framework member and the second vehicle framework member can be improved.

In the present aspect, the offset flange portions may be formed such that at least one of lengths or spacings in the extension direction are respectively different.

According to the structure described above, the plural offset flange portions are formed such that one or both of the lengths and spacings in the extension direction are different from one another. Therefore, the joining strength between the first vehicle framework member and the second vehicle framework member may be suitably regulated in the extension direction. For example, the joining strength between the first vehicle framework member and the second vehicle framework member can be raised in a region by lengthening the lengths of the offset flange portions and/or narrowing the spacings between the offset flange portions in that region.

In the present aspect, the first vehicle framework member may be a side rail of a suspension member, and the second vehicle framework member may be an extension portion that extends to the vehicle front side from each of two vehicle width direction end portions of a rear cross-member of the suspension member.

According to the structure described above, the first vehicle framework member is one of side rails that structure the suspension member, and the second vehicle framework member is one of extension portions that extend toward the vehicle front side from each of the two vehicle width direction end portions of the rear cross-member that structures the suspension member. Therefore, a fall in strength in the vicinity of the joining portion between the extension portion of the rear cross-member and the side rail, with respect to a load that is applied to the suspension member when there is a frontal collision of the vehicle, may be reduced.

BRIEF DESCRIPTION OF THE DRAWINGS

Exemplary embodiments of the present disclosure will be described in detail based on the following figures, wherein.

DETAILED DESCRIPTION

Herebelow, an exemplary embodiment relating to the present disclosure is described in detail in accordance with the drawings. For convenience of description, a structure in which a joining structure 10 according to the exemplary embodiment is employed at a suspension member 12 that serves as the vehicle framework members is taken as an example. The arrow UP that is illustrating in the drawings indicates a vehicle upper direction, the arrow FR indicates a vehicle front direction, and the arrow RH indicates a vehicle right direction. In the following descriptions, where the directions up, down, front, rear, left and right are recited without being particularly specified, the same represent up and down in the vehicle up-and-down direction, front and rear in the vehicle front-rear direction, and left and right in the vehicle left-and-right direction (the vehicle width direction).

Figure 1:
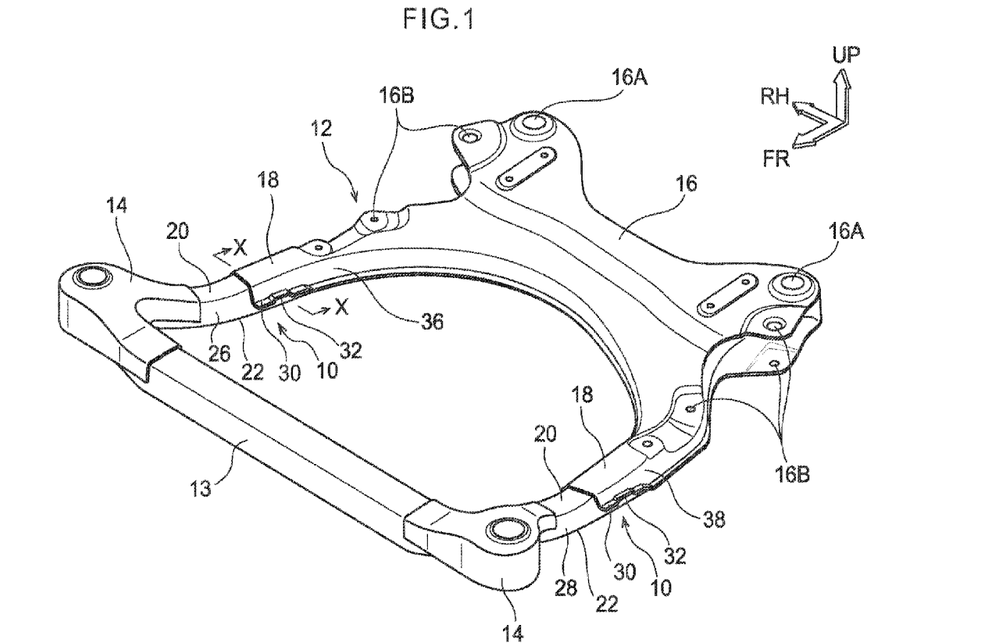
FIG. 1 is a perspective view illustrating a suspension member that is equipped with a joining structure of vehicle framework members in accordance with an exemplary embodiment.

The suspension member 12 illustrated in FIG. 1 is supported at front portion lower sides of a pair of left and right front side members (not illustrated in the drawings) that extend in the vehicle front-rear direction. The suspension member 12 is supported in a state of being suspended from the front side members. Each front side member includes a kick portion for disposing the vehicle front portion side thereof higher than the vehicle rear portion side thereof.

Accordingly, a pair of left and right front body mounts 14 are mounted to front end portions of the front side members at the vehicle front side relative to the kick portions, and a pair of left and right fastening portions 16A of a rear cross-member 16 are mounted to lower end portions of the kick portions. The front body mounts 14, which are described below, are front end portions of the suspension member 12. The rear cross-member 16, which is described below, is a rear end portion of the suspension member 12.

The suspension member 12 is provided with a front cross-member 13, which extends in the vehicle width direction, and the pair of left and right front body mounts 14, which are joined to each of two vehicle width direction end portions of the front cross-member 13.

The suspension member 12 extends in the vehicle width direction and is provided with the rear cross-member 16. The rear cross-member 16 includes sub-side rails 18 (second vehicle framework members) formed as a pair of left and right extension portions that extend integrally toward the respective vehicle front-outer sides from each of two vehicle width end portions in the vehicle width direction of the suspension member 12.

The suspension member 12 is also provided with a pair of left and right side rails 20 (first vehicle framework members) that extend in the directions of extension of the sub-side rails 18. Vehicle front side end portions of the side rails 20 are joined to the front body mounts 14, and vehicle rear side end portions of the side rails 20 are joined to the sub-side rails 18.

Each front body mount 14 is formed in an open cross section shape, of which the vehicle lower side is formed as an opening, by die-casting of a lightweight metal material such as an aluminium alloy or the like, and is formed in an "L" shape in plan view. The front body mount 14 is a structure that is supported by a front end portion of a front side member.

The rear cross-member 16 is also formed in an open cross section shape, of which the vehicle lower side is formed as an opening, by die-casting of a light metal material such as an aluminium alloy or the like. Each sub-side rail 18 is formed in an open cross section shape of which the vehicle lower side is formed as an opening. Specifically, the sub-side rail 18 is formed in a substantial hat shape in cross section with a greater plate thickness than the side rail 20.

The fastening portion 16A is formed at each of the two vehicle width direction end portions of the rear cross-member 16, for mounting the rear cross-member 16 to the lower end portions of the kick portions of the front side members. In addition, lower arm mounting portions 16B are formed at the two vehicle width direction end portions of the rear cross-member 16, at the vehicle front side relative to the fastening portions 16A, for mounting lower arms (not illustrated in the drawings) that structure suspension arms (not illustrated in the drawings).

The front cross-member 13 and the side rails 20 are formed in constant rectangular closed cross section shapes by extrusion molding of a lightweight metal material such as an aluminium alloy or the like. The front cross-member 13 and side rails 20 have higher ductility than the front body mounts 14 and the rear cross-member 16. Each side rail 20 includes, at a substantially central portion in the length direction (direction of extension) thereof, a curved portion 22 that forms a protrusion toward the vehicle lower side in a side view seen in the vehicle width direction (a downward protrusion shape).

Substantially an upper half (upper side) of an end portion of the side rail 20 at the vehicle rear side relative to the curved portion 22 is covered by the sub-side rail 18 and is linearly joined to the sub-side rail 18 by arc welding. Thus, in this structure, substantially the lower half (lower side) of the end portion of the side rail 20 at the vehicle rear side relative to the curved portion 22 is not covered by the sub-side rail 18 but is left in a state of being exposed to the exterior. The joining structure 10 is described in detail below.

Substantially an upper half (upper side) of an end portion of the side rail 20 at the vehicle front side relative to the curved portion 22 is covered by the front body mount 14 and is linearly joined thereto by arc welding. Thus, in this structure, substantially the lower half (lower side) of the end portion of the side rail 20 at the vehicle front side relative to the curved portion 22 is not covered by the front body mount 14 but is left in a state of being exposed to the exterior.

Substantially the upper half of each of the two vehicle width direction end portions of the front cross-member 13 is covered by the front body mount 14 and is linearly joined thereto by arc welding. Thus, in this structure, substantially the lower half (lower side) of the vehicle width direction end portion of the front cross-member 13 is not covered by the front body mount 14 but is left in a state of being exposed to the exterior.

A power unit (not illustrated in the drawings) including an engine and a transmission is disposed at the vehicle upper side of the suspension member 12. Accordingly, engine mounts (not illustrated in the drawings) for supporting the power unit from the lower side thereof are provided at a vehicle width direction substantially central portion of the front cross-member 13 of the suspension member 12.

Now, the joining structure 10 of the sub-side rail 18 to the side rail 20 is described in further detail.

Figure 2:
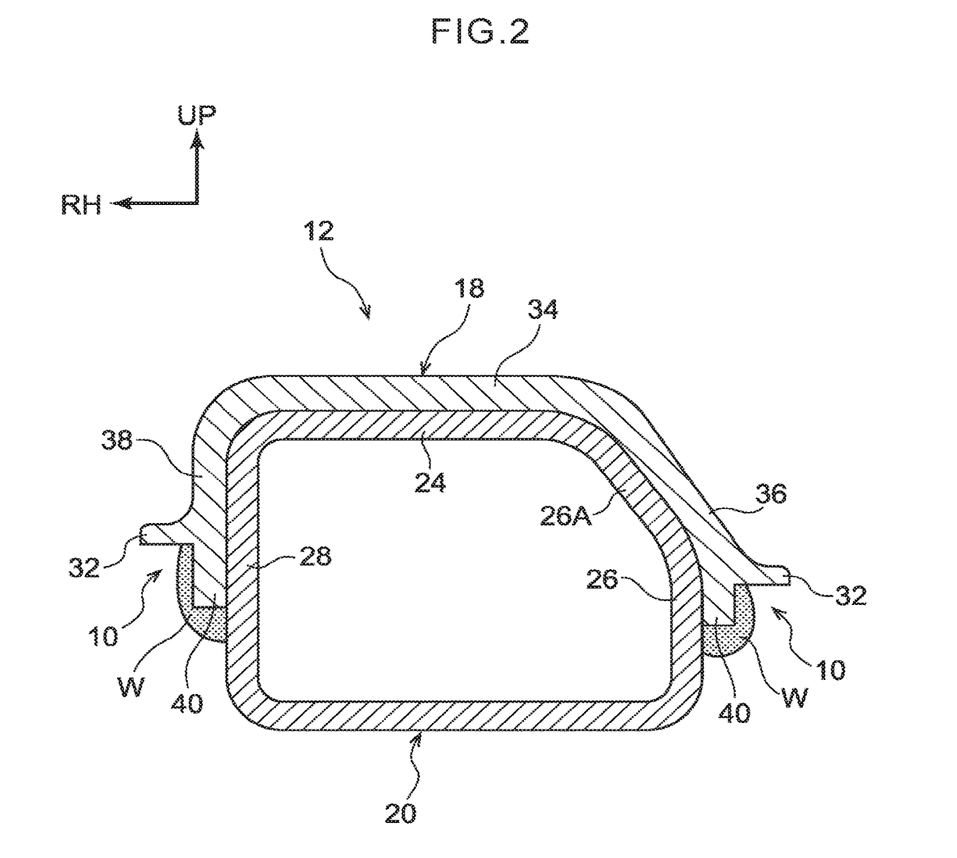
FIG. 2 is a sectional diagram taken along arrows X-X of FIG. 1.

As illustrated in FIG. 2, the sub-side rail 18 is formed in a substantial hat shape in cross section, which covers an upper portion of the side rail 20. The sub-side rail 18 includes an upper wall 34 that covers an upper wall 24 of the side rail 20, an inner wall 36 formed as a side wall that covers substantially the upper half of an inner wall 26 of the side rail 20, and an outer wall 38 formed as a side wall that covers substantially the upper half of an outer wall 28 of the side rail 20.

An upper portion of the inner wall 26 of the side rail 20 is formed as an angled wall 26A that, in a sectional view seen in the vehicle front-rear direction, is angled upward to the vehicle width direction outer side (downward to the vehicle width direction inner side) in order to avoid interference (contact) with the power unit and the like. The inner wall 36 of the sub-side rail 18 extends to the vehicle lower side to a position beyond the angled wall 26A of the side rail 20.

Figure 3A:
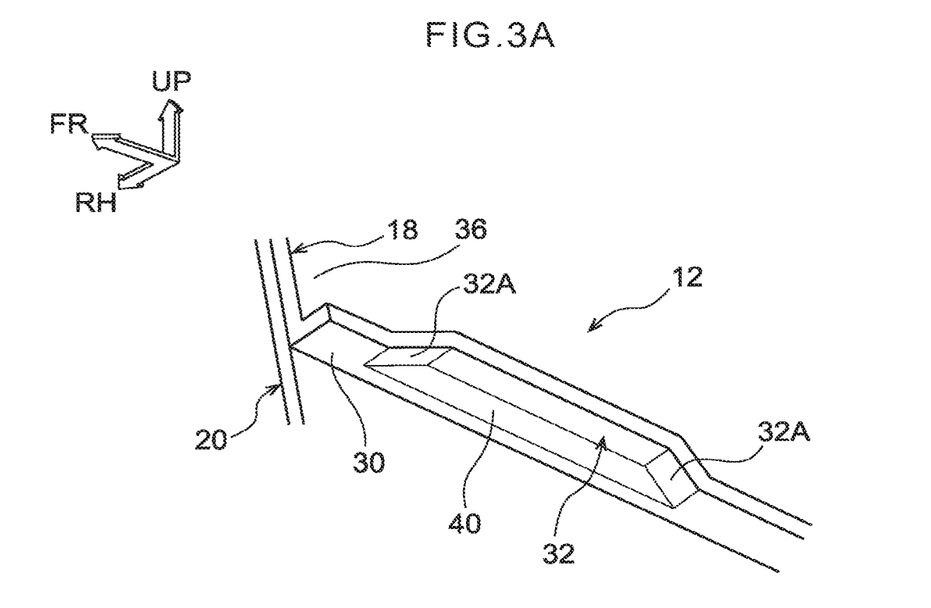
FIG. 3A is a perspective view illustrating a state before welding of the suspension member equipped with the joining structure of vehicle framework members in accordance with the exemplary embodiment.
Figure 3B:
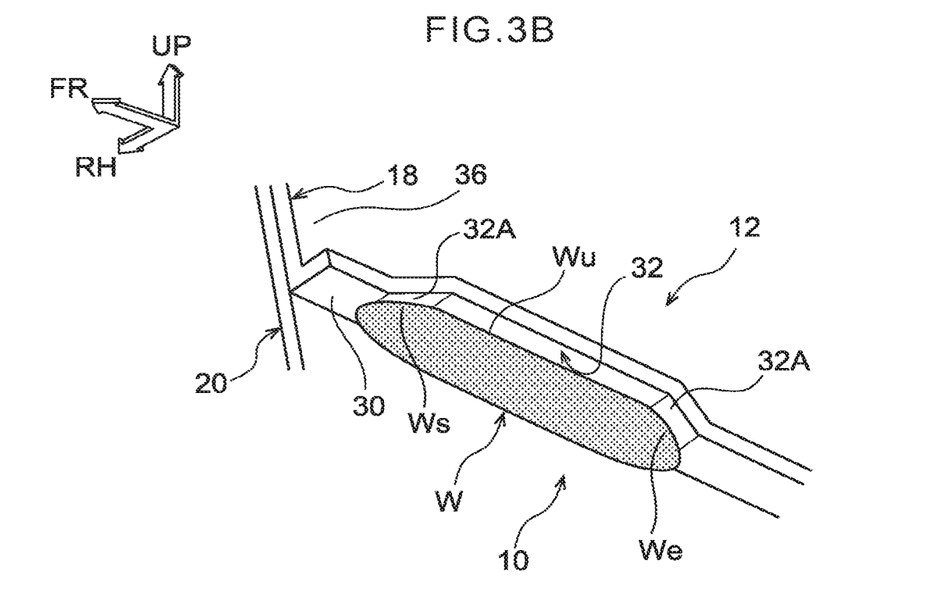
FIG. 3B is a perspective view illustrating a state after welding of the suspension member equipped with the joining structure of vehicle framework members in accordance with the exemplary embodiment.

As illustrated in FIG. 1, FIG. 3A and FIG. 3B, flange portions 30 are integrally formed at lower end portions of the inner wall 36 and outer wall 38 of the sub-side rail 18 (i.e., end portions thereof at the side of the sub-side rail 18 at which the opening is disposed). The flange portions 30 project to the vehicle width direction inner side and the vehicle width direction outer side, respectively. As illustrated in FIG. 1 to FIG. 4, a portion of each flange portion 30 is formed as an offset flange portion 32 that protrudes to the vehicle upper side relative to a lower end portion of the flange portion 30 (i.e., to the opposite side of the flange portion 30 from the side thereof at which the opening is disposed).

Specifically, the offset flange portion 32 is formed by a portion of the flange portion 30 being inflected toward the vehicle upper side. Two end portions of a length direction of the offset flange portion 32 are formed as angled walls 32A (see FIG. 3A and FIG. 3B) that are integrally continuous with the flange portion 30. A start end Ws and a finish end We of a weld portion W, which is described below, are formed along lower faces of the angled walls 32A.

Figure 4:
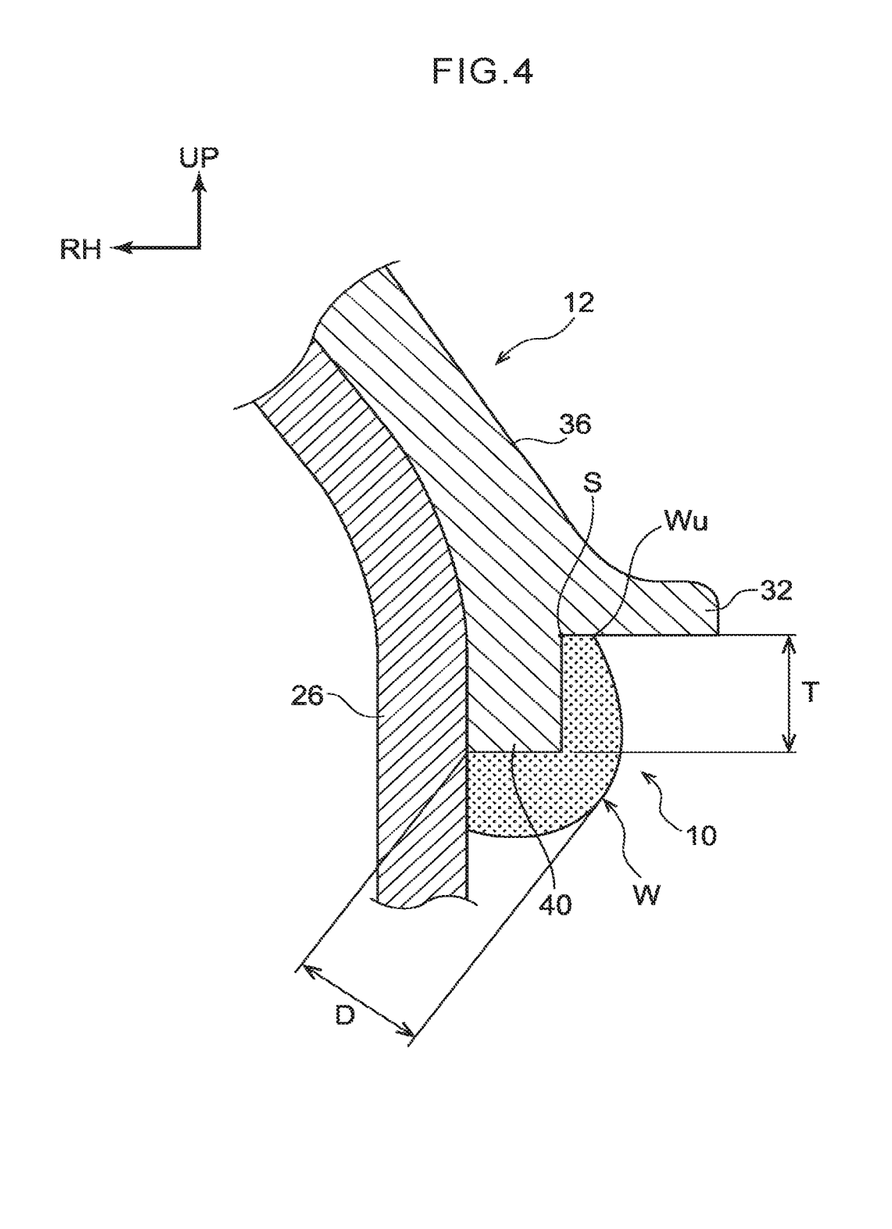
FIG. 4 is a sectional diagram illustrating an enlargement of a joining portion of the suspension member equipped with the joining structure of vehicle framework members in accordance with the exemplary embodiment.

As illustrated in FIG. 2 to FIG. 4, a protrusion portion 40 in a flat plate shape integrally protrudes toward the vehicle lower side from a lower face of each offset flange portion 32 (an end portion at the side of the offset flange portion 32 at which the opening is disposed) at a proximal side of the offset flange portion 32 (the side of the offset flange portion 32 at which the inner wall 26 or outer wall 28 of the offset flange portion 32 is disposed). Each protrusion portion 40 is linearly joined to the inner wall 26 or outer wall 28 of the side rail 20 by arc welding (heat-welding). Below, a region that is arc-welded is referred to as the weld portion W. Thus, the whole of the protrusion portion 40 is covered by the weld portion W (see FIG. 3B).

As illustrated in FIG. 4, a protrusion distance T of the protrusion portion 40 to the vehicle lower side is set to a distance such that an upper end Wu of the weld portion W may cover a line of intersection S between the lower face of the offset flange portion 32 and an outer face of the protrusion portion 40. For example, the protrusion portion 40 protrudes to an extent such that a lower face thereof is coplanar with a lower face of the flange portion 30, and a throat thickness D of the weld portion W is appropriately specified in accordance therewith.

Figure 5:
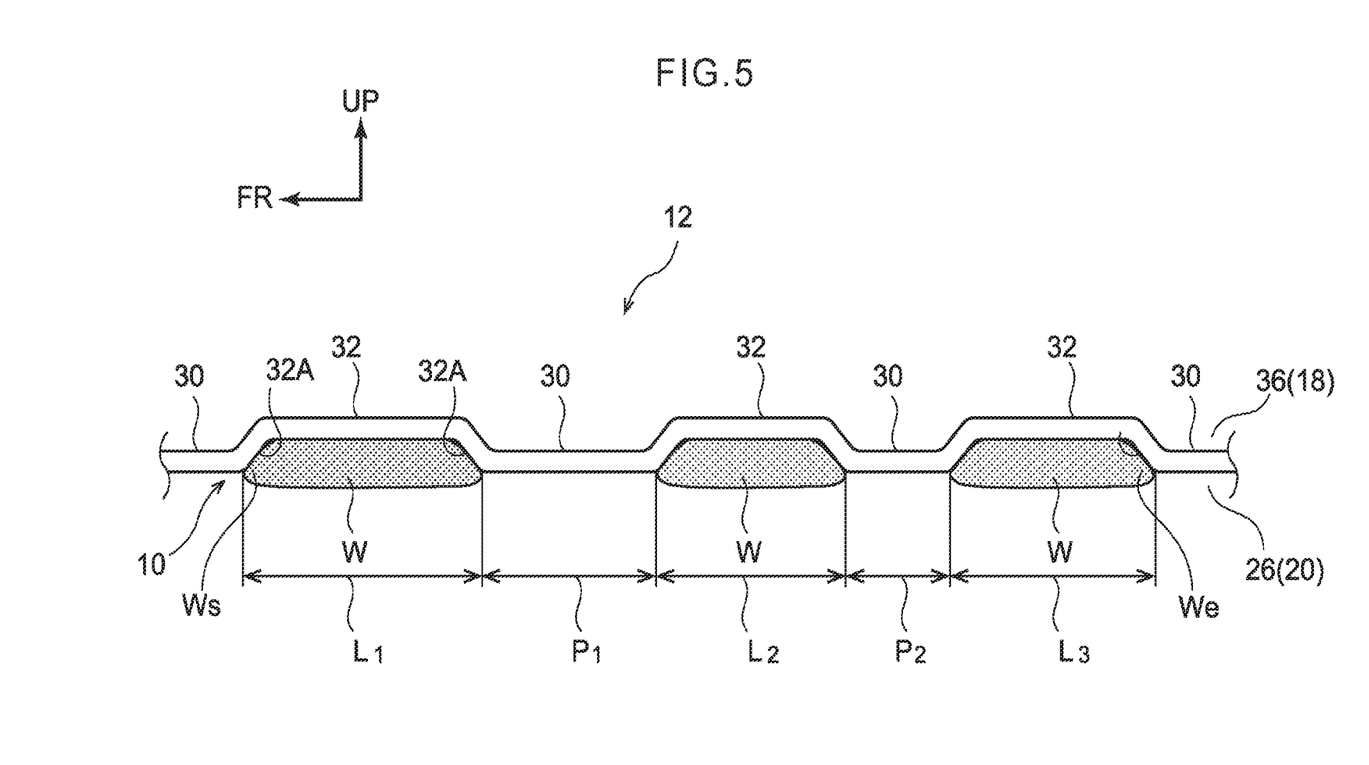
FIG. 5 is a sectional diagram illustrating an enlargement of plural joining portions of the suspension member equipped with the joining structure of vehicle framework members in accordance with the exemplary embodiment.

As illustrated in FIG. 5, the offset flange portion 32 may be plurally formed along the direction of extension (extension direction) of the sub-side rail 18 (and the side rail 20). In this case, the plural offset flange portions 32 may be formed such that lengths $L_1$, $L_2$ and $L_3$ thereof in the direction of extension are different from one another, and may be formed such that spacings $P_1$ and $P_2$ therebetween (pitches) are different from one another (i.e., the spacings are not uniform).

Operations of the suspension member 12 at which the joining structure 10 structured as described above is provided are described below.

Figure 6A:
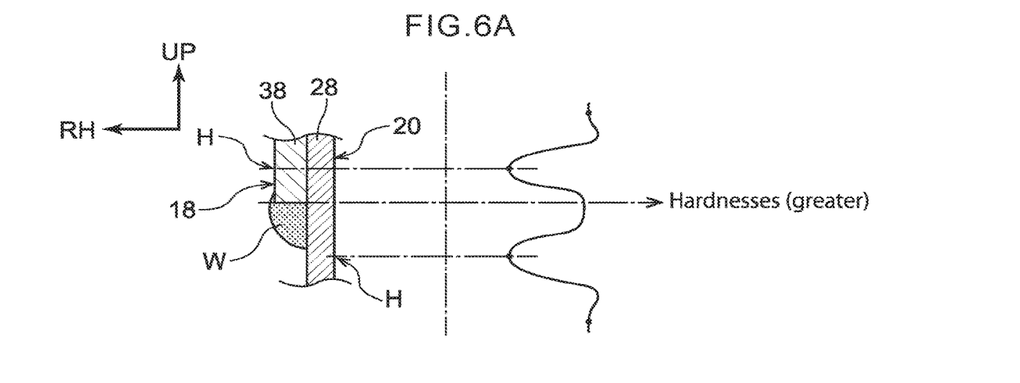
FIG. 6A is a sectional diagram illustrating an enlargement of a joining portion of a suspension member equipped with a joining structure of vehicle framework members in accordance with a first comparative example, and a graph illustrating the stiffnesses of respective portions.
Figure 6B:
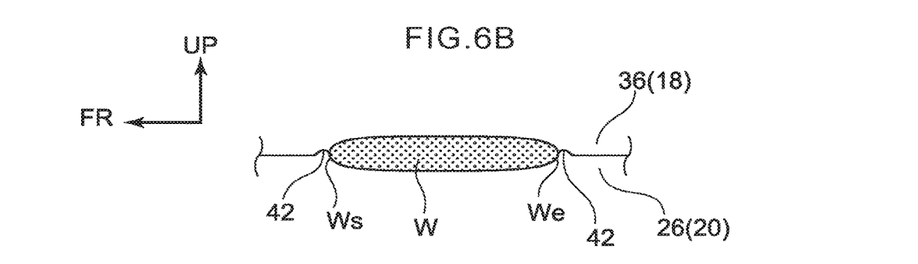
FIG. 6B is a side view illustrating an enlargement of a joining portion of the suspension member equipped with the joining structure of vehicle framework members in accordance with the first comparative example.

First, a suspension member equipped with a joining structure according to a comparative example that is illustrated in FIG. 6A and FIG. 6B is described. As illustrated in FIG. 6A, in a structure in which the flange portions 30 are not formed at the lower end portions of the inner wall 36 and outer wall 38 of the sub-side rail 18, these lower end portions are linearly joined by arc welding to the inner wall 26 and outer wall 28 of the side rail 20 (only the outer walls 28 and 38 are illustrated in FIG. 6A).

As a result, heat affected zones H that are softened by heat produced during the arc welding are formed in the vicinity of the weld portion W at portions of the inner wall 36 and outer wall 38 of the sub-side rail 18 and at portions of the inner wall 26 and outer wall 28 of the side rail 20. Hardnesses (strengths) of the heat affected zones H fall relative to hardnesses (strengths) of other portions, as illustrated in the graph at the right side of FIG. 6A. The more the strength of a material has been improved by a heat treatment, the greater the amount of this fall.

As illustrated in FIG. 6B, because excess heat is applied to the start end Ws and finish end We of this weld portion W (because an arc welding torch is temporarily stopped and applies heat thereat), portions of lower end portions of the inner wall 36 and outer wall 38 of the sub-side rail 18 (both sides of the weld portion W) may melt out and cavitation portions (defect portions) 42 may be formed at the lower end portions (only the inner walls 26 and 36 are illustrated in FIG. 6B).

If the cavitation portions 42 are formed at portions of the lower end portions of the inner wall 36 and outer wall 38 of the sub-side rail 18, then when, for example, a load is applied to the suspension member from the vehicle front side, stress concentrates at the cavitation portions 42 and there is a high likelihood of the inner wall 36 and outer wall 38 of the sub-side rail 18 breaking, starting from the cavitation portions 42.

Figure 6C:
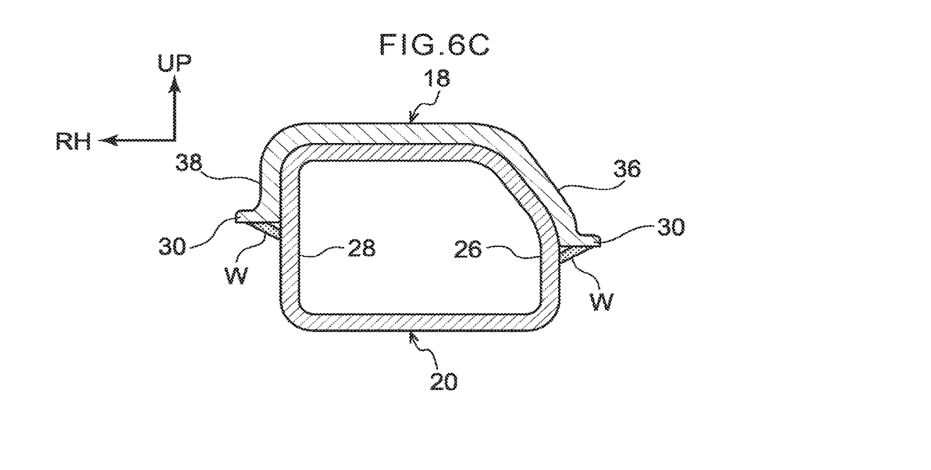
FIG. 6C is a sectional diagram illustrating an enlargement of a joining portion of a suspension member equipped with a joining structure of vehicle framework members in accordance with a second comparative example.

Accordingly, as illustrated in FIG. 6C, the flange portions 30 may be formed at the lower end portions of the inner wall 36 and outer wall 38 of the sub-side rail 18 to reinforce the heat affected zones H. In this case, however, each weld portion W is formed in a bridge shape and blowholes (in which air is trapped) may be formed in the weld portion W. That is, the weld quality of the weld portion W is unreliable (the throat thickness D may not be properly assured), and joining strength may be lowered.

Accordingly, in the joining structure 10 according to the exemplary embodiment, as illustrated in FIG. 1 to FIG. 4, a portion of each flange portion 30 is formed as the offset flange portion 32 that protrudes toward the vehicle upper side, and the protrusion portion 40 in the flat plate shape integrally protrudes toward the vehicle lower side from the lower face of the proximal side of the offset flange portion 32 (i.e., the side thereof at which the inner wall 26 or outer wall 28 of the side rail 20 is disposed).

Specifically, the protrusion distance T of each protrusion portion 40 toward the vehicle lower side is suitably specified (adjusted) such that the upper end Wu of the weld portion W may cover the line of intersection S between the lower face of the offset flange portion 32 and the outer face of the protrusion portion 40 (for example, the protrusion portion 40 protrudes to such an extent that the lower face thereof is coplanar with the lower face of the flange portion 30). The protrusion portions 40 are linearly joined to the inner wall 26 and outer wall 28, respectively, of the side rail 20 by arc welding.

Therefore, an area for the weld portion W, and particularly the throat thickness D that is important for improving joining strength of the weld portion W, may be suitably assured; thus, the joining strength may be reliably assured. Hence, even if heat affected zones H (softening) occur at portions of the inner wall 36 or outer wall 38 of the sub-side rail 18 and at portions of the inner wall 26 or outer wall 28 of the side rail 20, a fall in strength of the weld portion W (of vicinities of the protrusion portion 40 containing the heat affected zones H) may be reduced by the offset flange portion 32.

The start end Ws and finish end We of the weld portion W are formed in shapes that follow the shapes of the angled walls 32A of the offset flange portion 32 (see FIG. 5). Thus, volumes of the start end Ws and finish end We of the weld portion W are increased, and thermal capacities and conductive effectiveness of the start end Ws and finish end We are increased. Consequently, even if excess heat is applied at the protrusion portion 40 during arc welding, the heat is efficiently dispersed and melting out is unlikely to be caused by this heat. That is, formation of the cavitation portions 42 at both sides of the weld portion W (see FIG. 6B) is suppressed.

This effect can be expected to be particularly great with a lightweight metal material such as an aluminium alloy or the like, because the melting point is low and thermal conductivity is high. Even if melting out does occur at the protrusion portion 40, the effect of a reduction in strength simply due to the cavitation portion 42 being formed in a vicinity of the angled walls 32A of the offset flange portion 32 may be reduced. The offset flange portion 32 and a proximal region thereof may be formed with thicknesses greater than the thicknesses illustrated in the drawings, which may increase the heat dispersion effect.

Thus, according to the joining structure 10 of the exemplary embodiment, a fall in strength of the weld portions W between the sub-side rails 18 and side rails 20, which are crucial for assuring energy absorption performance of the suspension member 12 with respect to loads applied from the suspension, loads applied from the power unit and the like, and also a load applied when the vehicle has a frontal collision, may be suppressed, in addition to which weld quality may be made consistent (assuring joining strength).

That is, even if, for example, the vehicle has a frontal collision and a portion of a collision load is applied to the suspension member 12, deformation of a front end portion of each sub-side rail 18 toward the vehicle upper-rear side may be suppressed or prevented, even while a front end portion of the side rail 20 may efficiently deform (by plastic deformation) to bend toward the vehicle upper-rear side from the curved portion 22.

Further, when the side rail 20 is deforming to bend from the curved portion 22, separation of the side rail 20 from the sub-side rail 18 (fracturing of the weld portion W) may be suppressed or prevented. That is, the energy of a portion of the applied collision load may be absorbed by the side rail 20 efficiently, in addition to which a fall in the energy absorption performance of the side rail 20 may be suppressed.

At this time, because substantially the lower half of the end portion of the side rail 20 that is at the vehicle rear side relative to the curved portion 22 is not covered by the sub-side rail 18 but left exposed to the exterior, there is no likelihood of the deformation of the side rail 20 bending from the curved portion 22 (energy absorption by plastic deformation) being impeded by the sub-side rail 18.

Because the curved portion 22 is formed at a substantially central portion in the length direction of the side rail 20, the load tends to concentrate at the curved portion 22. Therefore, bending deformation of the side rail 20 from the curved portion 22 may be promoted (controlled excellently) and energy absorption performance may be improved.

The offset flange portion 32 may be plurally formed along the direction of extension of the sub-side rail 18, as illustrated in FIG. 5, in order to both suppress a fall in strength of the weld portion W (including deformations such as warping or distortion due to heat and the like) and make weld quality consistent (assuring and improving joining strength). In this case, lengths $L_1$, $L_2$ and $L_3$ and spacings $P_1$ and $P_2$ of the offset flange portions 32 may be formed to be respectively different.

Accordingly, the joining strength between the sub-side rail 18 and the side rail 20 may be suitably regulated in the direction of extension. For example, the joining strength between the sub-side rail 18 and the side rail 20 in a region may be made higher than in other regions by lengthening the lengths of the offset flange portions 32 and/or narrowing the spacings between the offset flange portions 32 in that region.

If the offset flange portion 32 is plurally formed along the direction of extension of the sub-side rail 18, it is sufficient if the offset flange portions 32 are formed such that at least one of the lengths $L_1$, $L_2$ and $L_3$ and the spacings $P_1$ and $P_2$ in the direction of extension are different from one another. Further, a structure of the offset flange portions 32 is possible in which, for example, the length $L_1$ and the length $L_2$ are the same and only the length $L_3$ is different.

Because the front body mounts 14 and the rear cross-member 16 are formed by die-casting of a lightweight metal material such as an aluminium alloy or the like, seat faces, bosses and the like for mounting other components may be formed easily. That is, the front body mounts 14 and the rear cross-member 16, even though high in hardness, may be improved in freedom of shape, enabling a reduction in a number of components (a rationalization of shape).

Because the front body mounts 14 and the rear cross-member 16 are formed in open cross section shapes of which the vehicle lower sides are open, assembly (joining) thereof to the front cross-member 13, the side rails 20 and the like is simple. Therefore, an assembly procedure of the suspension member 12 may be simplified.

Because the front cross-member 13 and the side rails 20 are formed by extrusion molding of a lightweight metal material such as an aluminium alloy or the like, similarly to the front body mounts 14 and the rear cross-member 16, a degree of freedom of shape is high and, because there is no need to cover the substantial lower halves of the respective end portions with covering members or the like, the number of components may be reduced. Therefore, the suspension member 12 that is formed of lightweight metal material may be further reduced in weight.

Because the each side rail 20 and sub-side rail 18 are linearly joined by arc-welding, the two may be strongly joined together. Thus, ingressions of foreign matter between the side rail 20 and the sub-side rail 18 may be suppressed or prevented. Therefore, occurrences of corrosion between the side rail 20 and the sub-side rail 18 may be suppressed or prevented. The same applies to the linear joins by arc-welding between each side rail 20 and front body mount 14.

In this structure, because the lower arms are mounted only at the rear cross-member 16, a support stiffness of the suspension member 12 with respect to the lower arms may be improved. Therefore, noise that is caused by vibrations inputted from front wheels (not illustrated in the drawings), the power unit and the like may be reduced.

Hereabove, the joining structure 10 of the vehicle framework members (the suspension member 12) according to the exemplary embodiment is described in accordance with the attached drawings. However, the joining structure 10 according to the exemplary embodiment is not limited to the illustrated structures but may be appropriately modified in design within a technical scope not departing from the gist of the present disclosure. For example, the protrusion distance T of each protrusion portion 40 is not limited to the distance illustrated in the drawings.

Moreover, if it is not necessary to suitably regulate the joining strength between the side rail 20 and the sub-side rail 18 in the direction of extension, the plural offset flange portions 32 may be formed such that the lengths $L_1$, $L_2$ and $L_3$ thereof in the direction of extension are the same as one another and such that the spacings $P_1$ and $P_2$ are the same as one another (such that the spacings are uniform).

The side rail 20 is not limited to a structure that includes the angled wall 26A, and the curved portion 22 of the side rail 20 is not limited to a structure that is formed at a substantially central portion in the length direction of the side rail 20. Further, the welding that linearly joins the side rail 20 to the sub-side rail 18 and the front body mount 14 is not limited to arc welding but may be, for example, laser welding or the like.

A lightweight metal material is not limited to an aluminium alloy but may be, for example, a magnesium alloy or the like. The joining structure 10 according to the exemplary embodiment is not limited to a structure that is applied to the suspension member 12. The joining structure 10 according to the exemplary embodiment may also be applied to joining structures of vehicle framework members such as, for example, front side members, front pillars, center pillars and the like, which are not illustrated in the drawings.

What is claimed is:

1. A joining structure of vehicle framework members, comprising:
    a first vehicle framework member formed by a lightweight metal material having a rectangular closed cross section shape in a sectional view orthogonal to an extension direction of the first vehicle framework member;
    a second vehicle framework member formed by a lightweight metal material having a hat shape in the sectional view orthogonal to the extension direction, the second vehicle framework member covering the first vehicle framework member;
    an offset flange portion that is a portion of a flange portion formed at an end portion at the side of the second vehicle framework member at which the opening is disposed, the offset flange portion protruding to an opposite side of the flange portion from the side at which the opening is disposed; and
    a protrusion portion that protrudes from an end portion of the offset flange portion at the side at which the opening is disposed, the protrusion portion being joined to the first vehicle framework member by heat-welding.

2. The joining structure of vehicle framework members according to claim 1, wherein the protrusion portion protrudes as far as the end portion of the flange portion at the side at which the opening is disposed.

3. The joining structure of vehicle framework members according to claim 1, wherein a plurality of the offset flange portions is formed along the extension direction.

4. The joining structure of vehicle framework members according to claim 3, wherein the offset flange portions are formed such that at least one of lengths or spacings in the extension direction are respectively different.

5. The joining structure of vehicle framework members according to claim 1, wherein
    the first vehicle framework member is a side rail of a suspension member, and
    the second vehicle framework member is an extension portion that extends to the vehicle front side from each of two vehicle width direction end portions of a rear cross-member of the suspension member.

* * * * *